United States Patent
Fukumoto

(10) Patent No.: US 8,104,525 B2
(45) Date of Patent: Jan. 31, 2012

(54) PNEUMATIC TIRE

(75) Inventor: Touru Fukumoto, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 792 days.

(21) Appl. No.: 12/216,454

(22) Filed: Jul. 3, 2008

(65) Prior Publication Data

US 2009/0020208 A1 Jan. 22, 2009

(30) Foreign Application Priority Data

Jul. 20, 2007 (JP) ................................. 2007-188992

(51) Int. Cl.
*B60C 9/18* (2006.01)
*B60C 9/22* (2006.01)

(52) U.S. Cl. ......... 152/526; 152/451; 152/531; 152/533

(58) Field of Classification Search ........................ None
See application file for complete search history.

(56) References Cited

U.S. PATENT DOCUMENTS

| | | | |
|---|---|---|---|
| 2,842,932 A | 7/1958 | Owens | |
| 2,842,934 A | 7/1958 | Owens | |
| 4,877,073 A * | 10/1989 | Thise et al. | 152/451 |
| 2004/0108037 A1 | 6/2004 | Osborne et al. | |

FOREIGN PATENT DOCUMENTS

| | | | |
|---|---|---|---|
| DE | 10206051 | * | 7/2003 |
| EP | 0296093 A1 | | 12/1988 |
| EP | 0335588 A2 | | 10/1989 |
| EP | 1568513 A2 | | 8/2005 |
| EP | 1698493 A1 | | 9/2006 |

OTHER PUBLICATIONS

Machine translation of DE 10206051, 2003.*

* cited by examiner

*Primary Examiner* — Justin Fischer
(74) *Attorney, Agent, or Firm* — Birch, Stewart, Kolash & Birch, LLP

(57) ABSTRACT

A pneumatic tire comprises a tread-reinforcing band made of at least one spirally wound cord, wherein the band cord consists of materially identical high-strength high-modulus organic filaments, and the band cord is formed by first twisting each of filament bunches, subjecting the first twisted bunches to a dip-and-stretch treatment, and then twisting the treated bunches together, whereby the load-elongation curve of the band cord comprises a low-modulus zone and a high-modulus zone whose boundary point is in an elongation range of from 1 to 7%, and the ratio EH/EL of a nominal elastic modulus EH of the high-modulus zone and a nominal elastic modulus EL of the low-modulus zone is in a range of from 2.0 to 10.0. Therefore, high-modulus aramid cords, PEN cords and the like can be used to reduce the tire weight.

6 Claims, 4 Drawing Sheets

PNEUMATIC TIRE

BACKGROUND OF THE INVENTION

The present invention relates to a pneumatic tire, more particularly to a tread-reinforcing band formed by spirally winding a specially treated organic fiber cord.

In order to improve the high-speed durability of a pneumatic tire such as passenger car tire, motorcycle tire and the like, a tread reinforcing band made of a spirally wound cord is widely used in the tread portion alone or in combination with a breaker.

Usually, nylon fiber cords are used as the cords of such a tread reinforcing band because of the following reason. During vulcanizing a green tire in a mold, the inside of the green tire is pressurized by the use of an inflatable bladder to press the outer surface of the green tire onto the inner surface of the mold. Therefore, if the band is not stretched or the amount of stretch is insufficient, the tread rubber is not fully pressed against the inner surface of the mold. As a result, the tire uniformity is deteriorated and vibrations are liable to occur during running especially high speed running. Further, in the worst case, molding defects occur in the tread portion. Accordingly, in order to secure a sufficient stretch during vulcanization, nylon fiber cords which are relatively low in the modulus and thus stretchable during vulcanization are widely used.

On the other hand, pneumatic tires are nowadays in urgent need of effective weight reductions to improve fuel economy or to reduce carbon dioxide emissions.

In order to reduce the weight of a tread reinforcing band, if the low modulus nylon fiber cords used in a band is decreased in the number and/or thickness, then it becomes difficult to secure the necessary strength, especially the high-speed durability of the tire.

If high-strength cords such as aromatic polyamide fiber cords are used as the band cords, the weight of the band can be reduced, but the above-mentioned problems arise since the conventional high-strength cords such as aromatic polyamide fiber cords have very high moduli and are hard to stretch during vulcanization as well as during use in the vulcanized tire.

SUMMARY OF THE INVENTION

It is therefore, an object of the present invention to provide a pneumatic tire, in which the tread-reinforcing band is formed by spirally winding a specially treated organic fiber cord to enable a weight reduction of the band.

According to the present invention, a pneumatic tire comprises a carcass extending between a pair of bead portions through a tread portion and a pair of sidewall portions, and a band made of at least one spirally wound cord disposed radially outside the carcass in the tread portion, wherein the band cord consists of materially identical high-strength high-modulus organic filaments, and the band cord is obtainable by the following process (1) or (2):

(1) the high-modulus organic filaments are divided into a plurality of bunches, the bunches are each first twisted separately from each other, the first twisted bunches are each subjected to a dip-and-stretch treatment, and the treated bunches are second twisted together; or (2) the high-modulus organic filaments are divided into a plurality of bunches, the bunches are each first twisted separately from each other, the first twisted bunches are each subjected to a dip-and-stretch treatment, some of the treated bunches are second twisted together to form a core, and at least one remaining treated bunch is twisted around the core, whereby the band cord has a load-elongation curve comprising a low-modulus zone between the origin and a boundary point and a high-modulus zone between the boundary point and the cord breaking point, and the boundary point is in an elongation range between 1% and 7%, and the ratio EH/EL of a nominal elastic modulus EH of the high-modulus zone and a nominal elastic modulus EL of the low-modulus zone is in a range of from 2.0 to 10.0.

As shown in FIG. 1, the boundary point P is defined as a point on the load-elongation curve J of which elongation percentage is the same as that of the intersecting point P0 between two tangential lines T1 and T2 to the load-elongation curve J at the original point (elongation=0) and the breaking point P1 of the cord.

The nominal elastic modulus EL of the low-modulus zone S1 is defined by the slope of a line drawn between the origin O and the boundary point P. The nominal elastic modulus EH of the high-modulus zone s2 is defined by the slope of a line drawn between the boundary point P and breaking point P1.

The above-mentioned high-strength high-modulus organic filaments are, for example, aromatic polyamide filaments, fully aromatic polyester filaments, polyvinyl alcohol filaments whose strength is not less than 15 g/dtex, carbon filaments, polyketone filaments, rayon filaments and the like.

As described above, the band cord is formed by first twisting each of the filament bunches, and subjecting the first-twisted bunches to a dip-and-stretch treatment, and then second twisting the treated bunches together. By making these processes in this order, the cord is provided with an elongation characteristic having a low-modulus zone and a high-modulus zone as shown in FIG. 1 in full line.

If the cord is formed in the following order [first twisting each of the filament bunches, second twisting the first-twisted bunches together into the cord, and then subjecting the second twisted bunches(namely the cord) to the dip-and-stretch treatment], then the load-elongation curve j becomes almost linear from the original point to the breaking point P1 as shown in FIG. 1 in broken line and the cord is provided with a completely different elongation characteristic.

In this invention, therefore, in spite of a cord made of high-strength high-modulus organic filaments, a sufficient stretch can be obtained during tire vulcanization, and as a result, a deterioration in the tire uniformity can be avoided. Further, because of the high-strength high-modulus organic filaments, the thickness of the cord can be decreased while maintaining the necessary cord strength. Accordingly, the weight of the band can be decreased to achieve a tire weight reduction without sacrificing the high-speed durability and the like.

DESCRIPTION OF THE PREFERRED EMBODIMENTS

Figure 1:
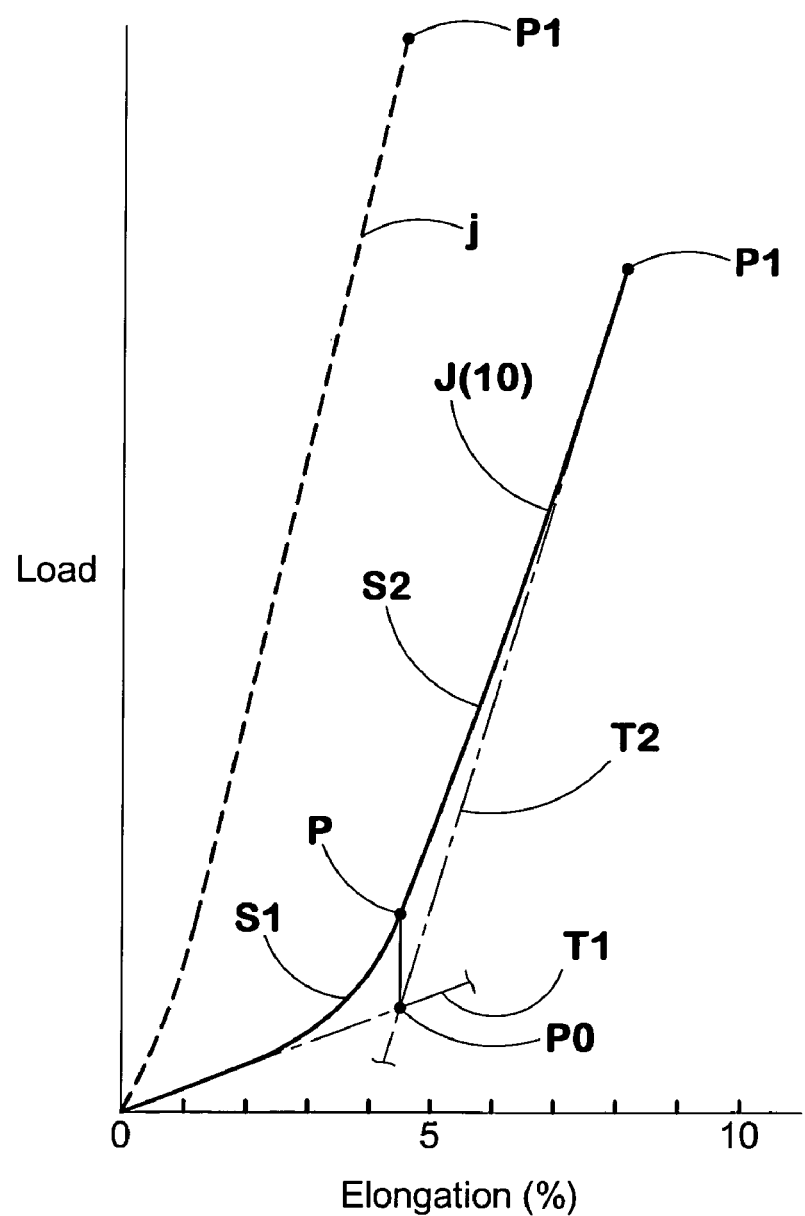
FIG. 1 is a graph showing a load-elongation curve (full line) of a band cord according to the present invention in contradistinction to a conventional load-elongation curve (broken line).

Embodiment of the present invention will now be described in detail in conjunction with accompanying drawings.

According to the present invention, pneumatic tire 1 comprises a tread portion 2, a pair of sidewall portions 3, a pair of bead portions 4 each with a bead core 5 therein, a carcass 6 extended between the bead portions 4 through the tread portion 2 and sidewall portions 3, and a band 9 disposed radially outside the crown portion of the carcass 6 in the tread portion 2.

Figure 2:
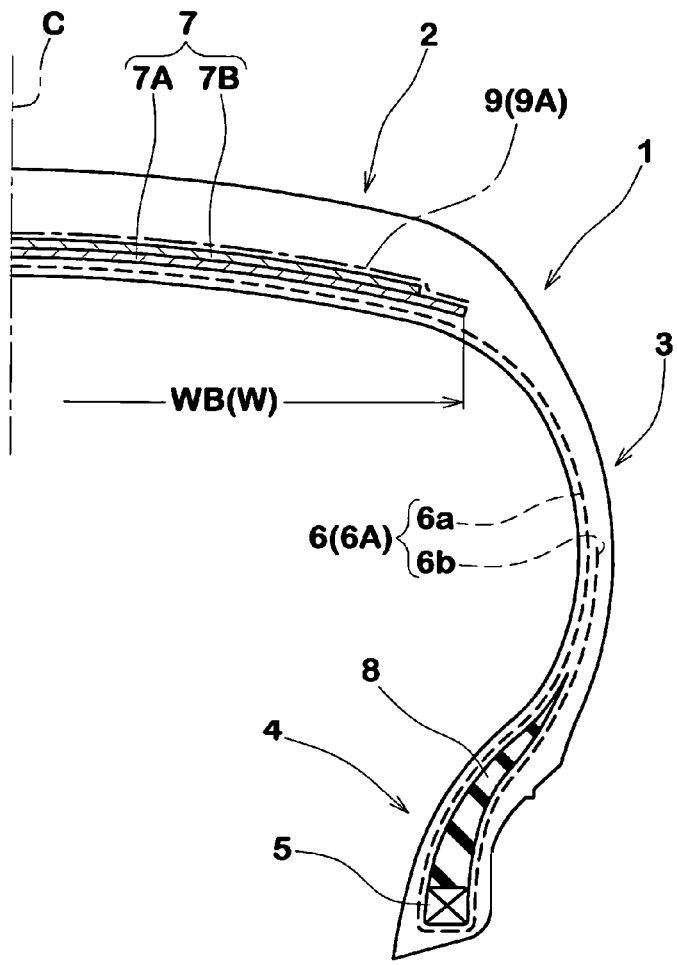
FIG. 2 is a cross sectional view showing a pneumatic tire according to the present invention.

In this embodiment, the tire 1 is a radial tire for passenger cars provided in the tread portion 2 with a breaker 7, and the band 9 is disposed on the radially outside of the breaker 7 as shown in FIG. 2.

The carcass 6 is composed of at least one ply 6A of cords arranged radially at an angle of 75 to 90 degrees with respect to the tire equator.
For the carcass cords, organic fiber cords such as polyester (polyethylene terephthalate, polyethylene naphtarete, fully aromatic polyester), nylon (aliphatic polyamide), rayon and the like are suitably used in the case of passenger car tires. But, steel cords can be used too, depending on the tire size, usage and the like.
In this embodiment, the carcass is composed of a single ply 6A of PET cords arranged radially at 90 degrees, and the cord count is set in a range of from 40 to 60 ends/5 cm.
The carcass ply 6A extends between the bead portions 4 through the tread portion 2 and sidewall portions 3, and is turned up around the bead core 5 in each of the bead portions from the inside to the outside of the tire to form a pair of carcass ply turnup portions 6b and a carcass ply main portion 6a therebetween. Between each of the carcass ply turnup portions 6b and the ply main portion 6a, there is disposed a bead apex 8 made of a hard rubber extending radially outwardly from the bead core 5 while tapering towards its radially outer end.

The breaker 7 is disposed radially outside the crown portion of the carcass 6, and composed of at least two plies 7A and 7B each made of parallel cords laid at an angle of 15 to 40 degrees with respect to the tire equator.
For the breaker cords, high-strength cords such as steel cords, high modulus organic fiber cords such as polyethylene naphtarete(PEN), polyethylene terephthalate(PET) and aromatic polyamide and the like can be used.
With respect to the tire equator, the cords in the radially inner ply 7A are inclined towards one direction, and the cords in the radially outer ply 7B are inclined towards the opposite direction to the above-mentioned one direction.
The radially inner ply 7A is the widest ply of which width defines the width WB of the breaker 7. The radially outer ply 7B is smaller in width than the inner ply 7A.
In this embodiment, the breaker 7 is composed of the two cross plies 7A and 7B of steel cords, and extends. all over the width of the tread portion.

The band 9 is composed of at least one ply 9A of at least one cord 10 wound spirally at an angle of not more than 5 degrees with respect to the tire circumferential direction. The ply 9A can be a full-width ply covering the substantially entire width of the breaker 7, namely, not less than 95% of the breaker width WB, or a pair of axially spaced edge plies each covering one of the axial edge portions of the breaker 7. Thus, the band 9 can be the full-width ply(s) only, or the axially spaced edge plies only, or a combination of the full-width ply(s) and the edge plies.

In this embodiment, the band 9 is made up of a single full-width ply, and the width W of the band 9 is almost same as the width WB of the breaker 7.

Figure 3:
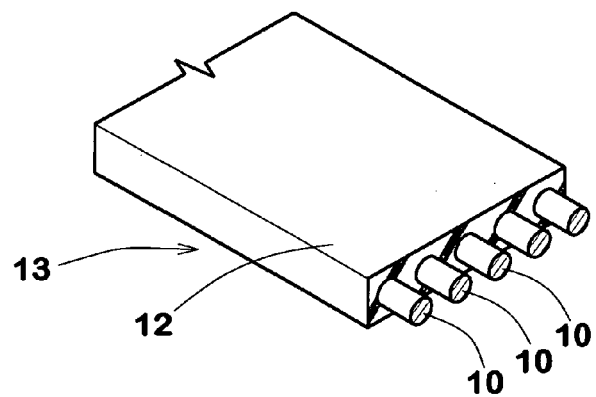
FIG. 3 is a schematic perspective view showing band cords rubberized in a form of a tape.

In this embodiment, in order to improve the manufacturing efficiency, the band ply 9A is formed by spiral winding a tape 13 of unvulcanized rubber 12 in which a plurality of parallel cords 10 are embedded along the length thereof as shown in FIG. 3. of course it is possible to wind a single cord 10 alone or a tape of unvulcanized rubber 12 in which a single cord 10 is embedded along the length thereof. In the case of the tape 13, the number of the cords embedded therein is at most 10, usually 4 to 6.

In any case, the angles of the windings of the band cord(s) are not more than 5 degrees with respect to the tire circumferential direction in order to improve the tire uniformity and to provide a strong hoop effect for the tread portion 2.

The tire 1 is manufactured by first making the green tire by assembling raw tire components including the band, and then vulcanizing the green tire in a mold as usual. During vulcanizing the green tire in the mold, a bladder put inside the green tire is inflated to press the outer surface of the green tire onto the inner surface of the mold. Therefore, although it is desirable that the band is hard to stretch in the finished tire, the raw band has to be stretched during vulcanization in order that the outer surface of the tread portion is fully pressed onto the tread molding face of the mold. For that purpose, in general, about 2% elongation is required for the band cord, therefore the cord modulus should be relatively low in a cord elongation range between 0% and about 2%.

To achieve such a double modulus cord as shown in FIG. 1, the load-elongation curve a of the band cord 10 has to be provided with a low-modulus zone S1 and a high-modulus zone S2 of which boundary point P is in an elongation range of from 1.0 to 7.0%, and the nominal modulus ratio EH/EL is not less than 2.0 but not more than 10.0.

If the load of the band cord 10 at 1% elongation is more than 60 N, the stretch during vulcanization becomes insufficient. If the load at 1% elongation is less than 20 N, although a sufficient stretch can be obtained, in the finished tire the hoop effect of the band is decreased and the high speed durability tends to deteriorate. Therefore, the load at 1% elongation is preferably set in a range of from 20 to 60 N.

If the load of the band cord 10 at 3% elongation is less than 225 N, there is a tendency that the rigidity of the tread portion becomes insufficient and as a result the steering stability is deteriorated. If the load at 3% elongation is more than 431 N, the rigidity becomes excessively increased and the ride comfort is decreased. Therefore, the load at 3% elongation is preferably set in a range of from 225 to 431 N.

In order to reduce the weight of the band, the band cord 10 is made up of a plurality of materially identical high-strength high-modulus organic filaments (f).

As such high-strength high-modulus organic filaments (f), for example, aromatic polyamide filaments, fully aromatic polyester filaments, polyvinyl alcohol filaments whose strength is not less than 15 g/dtex, carbon filaments, polyketone filaments, rayon filaments and the like can be used. Among them, aromatic polyamide filaments are especially preferred.

If materially different organic filaments are incorporated into one cord, which usually results in coexistence of a high-modulus filament and a low-modulus filament, thus, the load applied to the cord is unevenly shared therebetween, and one of them is first broken and then the other is broken as the load concentrate thereon. Thus, on the whole the cord tends to become weak when compared with the cord according to the present invention having the same weight.

The band cord 10 is made up of a plurality of dip-and-stretch treated strands 22 (hereinafter dipped strands 22). In the example shown in FIG. 4, the band cord 10 is made up of two dipped strands 22. In FIG. 5 showing another example, the cord 10 is made up of four dipped strands 22.
The number of the dipped strands 22 is at least two, preferably at most 8, more preferably 6 or less.

In any case, each of the strands 22 is formed by first-twisting a bunch 21 of a plurality of the organic filaments (f).

Then, the first-twisted filament bunch 21 is subjected to a dip-and-stretch treatment K.

Figure 6:
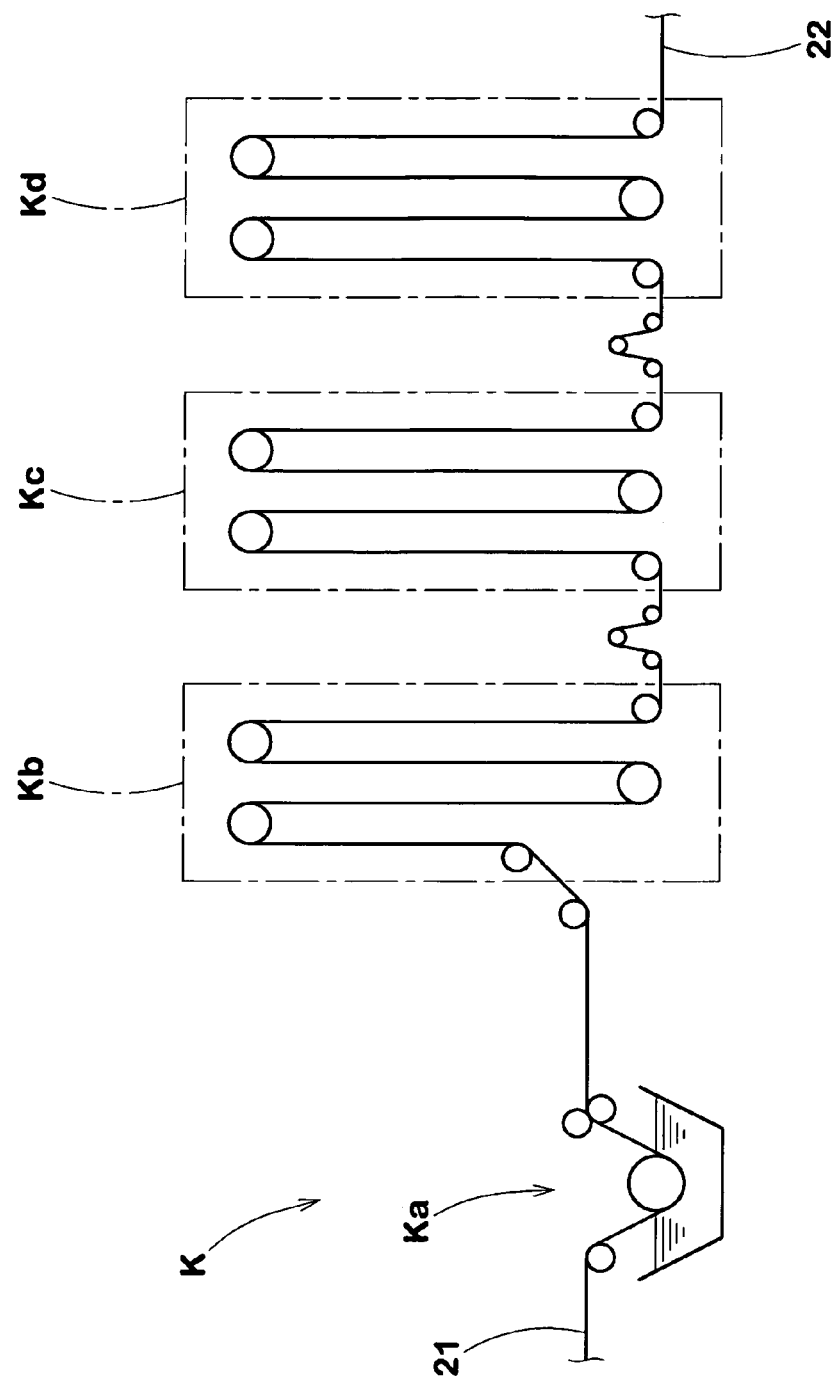
FIG. 6 is a diagram for explaining a dip-and-stretch treatment.

As shown in FIG. 6, the dip-and-stretch treatment K comprises a dip process Ka, a drying process Kb, a stretch process Kc, and a relax process Kd.

The dip process Ka is such that the first-twisted filament bunch 21 is dipped into a solution of a resin to coat the surfaces of the organic filaments. For example, resorcinol formalin latex can be used as the solution.
In the case of organic filaments inferior to adhesion with rubber such as aromatic polyamide and fully aromatic polyester, it is preferable that an additive to improve the adhesion such as epoxy compounds, isocyanate compounds, urea compounds and the like is added into the solution.
Also it is preferred to subject the bunch 21 to a two-bath dipping process, where first dipped into a solution or emulsion of the above-mentioned additive to improve the adhesion and then dipped into the above-mentioned solution of the resin.

The drying process Kb is such that the dipped filament bunch 21 is dried by heating it to a specific temperature controlled within a range of from 100 to 160 degrees C. for 60 to 300 seconds until completely or almost completely dried, while applying a tension of 0.1 to 1.5 g/dtex.

The stretch process Kc is such that the filament bunch 21 is stretched by applying a specific tension in a range of 0.1 to 1.5 d/dtex for example 0.2 g/dtex, while heating it to a specific temperature controlled within a range of from 215 to 255 degrees C. for 30 to 120 seconds.

The relax process Kd is such that the filament bunch 21 is gradually cooled to room temperature, while gradually decreasing the above-mentioned applied tension.

With this dip-and-stretch treatment K, the dipped strand 22 is accomplished. Then, directly or indirectly after reeled, the treated strand 22 is fed to the next process (1) or (2).

Figure 4:
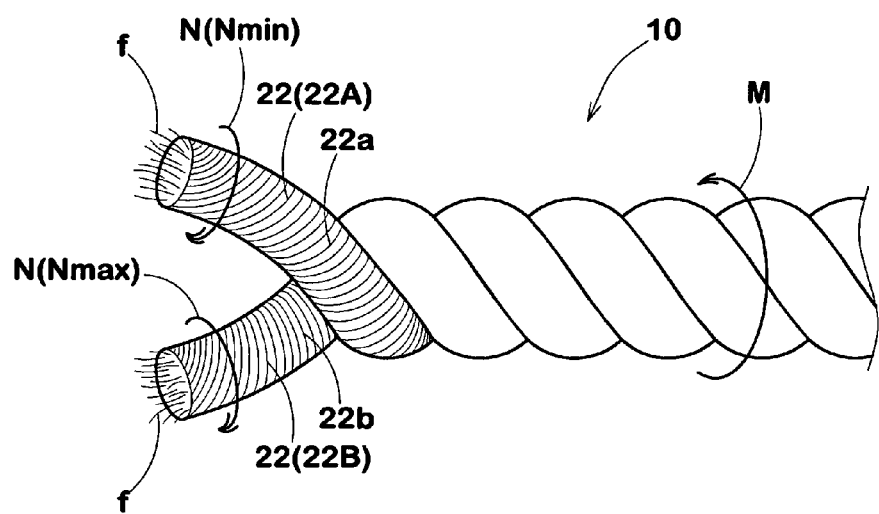
FIG. 4 is a schematic perspective view showing an example of the band cord.
Figure 5:
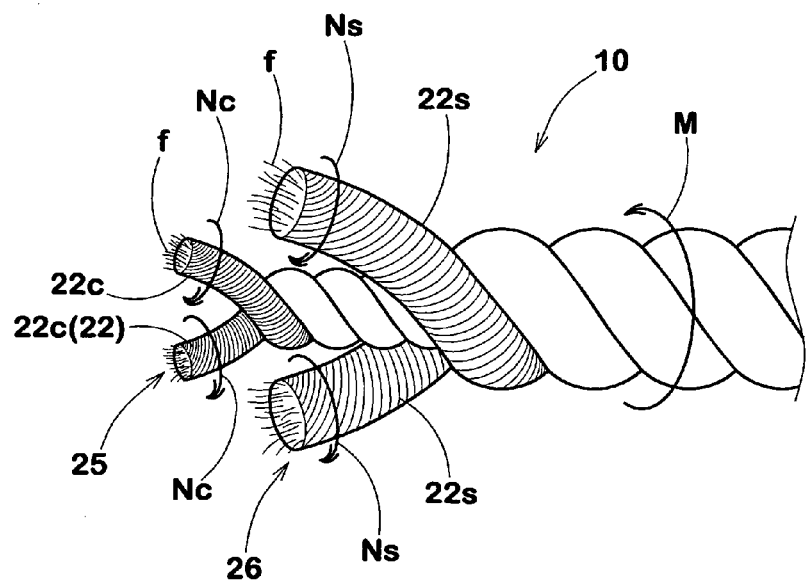
FIG. 5 is a schematic perspective view showing another example of the band cord.

The process (1) is utilized to make the example cord shown in FIG. 4. In this process, the two or more strands 22 are second twisted together into the final cord 10. Thus, the second twist is the last twist.
All of the strands 22 have the same first twist directions which are opposite to the second twist direction.
It is possible that all of the strands 22 have the same first twist numbers, but in this example, in order to increase of the ratio EH/EL, the dipped strands 22 include at least two types of strands: one is a low-twist strand 22A whose first twist number N is a minimum value Nmin, and another is a high-twist strand 22B whose first twist number N is a maximum value Nmax, wherein the ratio Nmin/Nmax is preferably not more than 0.9, more preferably not more than 0.8, but, preferably not less than 0.5. In this case, in view of the compatibility between the fatigue resistance of the cord and the nominal elastic modulus EH of the high-modulus zone, the second twist number M of the cord 10 is preferably not less than the minimum value Nmin and not more than the maximum value Nmax. It is especially preferable that the second twist number M is equal to the minimum value Nmin.

As to the thickness of the strand (or the total dtex number of the filaments therein), it is possible that all of the strands 22 have the same thickness. But, it is also possible that the strands 22 have different thicknesses. In the later case, accordingly the cord is composed of at least one thicker strand 22a and at least one thinner strand 22b. Preferably, the first twist number of the thinnest dipped strand 22b is set at the maximum value Nmax, and the first twist number of the thickest dipped strand 22a is set at the minimum value Nmin. This also facilities the increase of the ratio EH/EL.

The process (2) is utilized to make another example cord 10 which is, as shown in FIG. 5, made up of at least one dipped strand 22c (in FIG. 5 two dipped strands 22c) forming a core 25, and at least one dipped strand 22s (in FIG. 5 two dipped strands 22s) forming a sheathe 26 around the core 25.
In this cord structure, it is preferable that the ratio DS/DC of the total dtex number DS of the strand 22s forming the sheathe to the total dtex number DC of the strand 22c forming the core is not less than 2.3; and
the first twist number NS of the sheath strand 22s is less than the first twist number NC of the core strand 22c, and the ratio NS/Nc is in a range of from 0.07 to 0.11.

In the case that the core 25 is made up of a single strand 22c, a plurality of strands 22s are second twisted around the core 25.

In the case that the core 25 is made up of a plurality of strands 22c, these strands 22c are second twisted into the core 25. And then at least one strand 22s is second twisted around the core 25 in the same direction as the second twist direction of the core. The second twist number M of the sheath strand 22s is less than the first twist number NC of the core strand 22c and in a range of from 0.5 to 1.2 times the first twist number NS of the sheath strand 22s.

In the case of the core 25 made up of a plurality of strands 22c, the second twist of the core strands 22c may be omitted substantially because the sheathe 26 can prevent the core strands 22c from loosing.

In any case, the position of the boundary point P and the value of EH/EL can be adjusted by changing the thickness, first twist number and second twist number of the strands 22.
Comparison Tests Radial tires of size 205/50R16 (rim size 16×6.511) for passenger cars were made and tested for high-speed durability and vibration characteristic (uniformity).

Except for the band cords, all of the tires had the same structure shown in FIG. 2, wherein
the carcass was composed of a single ply of 1680 dtex/2 PET cords arranged at 90 degrees with respect to the tire equator with a cord count of 50 ends/5 cm beneath the bead cores,
the breaker was composed of two cross plies of 1×4×0.27 steel cords laid at +22 and −22 degrees with respect to the tire equator with a cord count of 40 ends/5 cm, and
the band was composed of a full-width ply made of spirally wound cords shown in Table 1 and 2 with a cord count of 49 ends/5 cm.

High-Speed Durability Test:

The tire inflated to 300 kPa was run under a tire load of 3.90 kN by the use of a tire drum tester, and the running speed was increased every 20 minutes at a constant step of 10 km/h in order to obtain the running speed at which any damage was caused on the tire resulting from the band. The test results are indicate in Tables 1 and 2 by an index based on Ref.1 tire being 100 wherein the larger the value, the better the durability.

Vibration Characteristic Test:

The tire inflated to 200 kPa was run at a speed of 120 km/h under a tire load of 4.00 kN by the use of a tire drum tester, and vibrations generated by the rotating tire were measured on the axle.

B: first twist, dip-and-stretch treatment, and then second twist.

In the "Status of vulcanization" item,

\*1: The stretch of the band during vulcanizing the green tire became insufficient and a molding defect occurred.

TABLE 1

| Tire | Ref. 1 | Ref. 2 | Ref. 3 | Ref. 4 | Ref. 5 | Ref. 6 | Ref. 7 | Ex. 1 |
|---|---|---|---|---|---|---|---|---|
| Band cord | | | | | | | | |
| Material | nylon & aramid | nylon | aramid | aramid | aramid | aramid | rayon | aramid |
| Twist structure | FIG. 4 | FIG. 4 | FIG. 4 | FIG. 4 | FIG. 4 | FIG. 4 | FIG. 4 | FIG. 4 |
| Number of strands | 2 | 2 | 2 | 2 | 2 | 2 | 2 | 2 |
| One strand | nylon | | | | | | | |
| Total dtex number | 940 | 940 | 1670 | 1100 | 1100 | 800 | 1220 | 1100 |
| First twist number* | 30 | 47 | 30 | 46 | 68 | 80 | 59 | 68 |
| Other strand | aramid | | | | | | | |
| Total dtex number | 1670 | 940 | 1670 | 1100 | 1100 | 1100 | 1840 | 1100 |
| First twist number* | 42 | 47 | 30 | 46 | 52 | 52 | 48 | 52 |
| Nmin/Nmax | 1 | 1 | 1 | 1 | 0.76 | 0.65 | 0.81 | 0.76 |
| Second twist number* | 43 | 47 | 30 | 46 | 52 | 52 | 48 | 52 |
| Boundary point (%) | 4.1 | non | non | non | non | non | non | 3.0 |
| Modulus ratio (EH/EL) | 7.5 | 1 | 1 | 1 | 1 | 1 | 1 | 3 |
| Fabrication sequence | A | A | A | A | A | A | A | B |
| Status of vulcanization | no problem | no problem | *1 | *1 | *1 | *1 | *1 | no problem |
| Tire weight | 100 | 99.8 | 100.3 | 100.2 | 100.1 | 99.8 | 100.5 | 99.9 |
| High-speed durability | 100 | 95 | — | — | — | — | — | 108 |
| Vibration characteristic | 100 | 85 | — | — | — | — | — | 107 |

| Tire | Ex. 2 | Ex. 3 | Ex. 4 | Ex. 5 | Ex. 6 | Ex. 7 | Ex. 8 |
|---|---|---|---|---|---|---|---|
| Band cord | | | | | | | |
| Material | aramid | aramid | rayon | Vinylon | Vectran | PET | PEN |
| Twist structure | FIG. 4 | FIG. 4 | FIG. 4 | FIG. 4 | FIG. 4 | FIG. 4 | FIG. 4 |
| Number of strands | 2 | 2 | 2 | 2 | 2 | 2 | 2 |
| One strand | | | | | | | |
| Total dtex number | 800 | 440 | 1220 | 1130 | 1100 | 1670 | 1670 |
| First twist number* | 80 | 108 | 59 | 60 | 60 | 40 | 40 |
| Other strand | | | | | | | |
| Total dtex number | 1100 | 1100 | 1840 | 1130 | 1100 | 1670 | 1670 |
| First twist number* | 52 | 52 | 48 | 38 | 53 | 30 | 30 |
| Nmin/Nmax | 0.65 | 0.48 | 0.81 | 0.63 | 0.88 | 0.75 | 0.75 |
| Second twist number* | 52 | 52 | 48 | 38 | 53 | 40 | 40 |
| Boundary point (%) | 3.0 | 7.0 | 5.0 | 6.0 | 2.0 | 4.0 | 4.0 |
| Modulus ratio (EH/EL) | 4 | 10 | 6 | 7 | 2 | 5 | 5 |
| Fabrication sequence | B | B | B | B | B | B | B |
| Status of vulcanization | no problem | no problem | no problem | no problem | no problem | no problem | no problem |
| Tire weight | 99.8 | 99.7 | 100.5 | 100 | 100 | 100.4 | 100.4 |
| High-speed durability | 107 | 105 | 102 | 101 | 101 | 104 | 105 |
| Vibration characteristic | 106 | 103 | 102 | 102 | 101 | 105 | 106 |

*turn/10 cm

The results are indicated in Tables 1 and 2 by an index-based on Ref.1 being 100, wherein the larger the value, the better the vibration characteristic.

Tire Weight:

The weight is indicate by an index based on Ref.1 being 100.

The abbreviations used in Table 1 and 2 are as follows.

In the "Material" item,
  nylon: aliphatic polyamide
  aramid: aromatic polyamide
  rayon: rayon
  vinylon: polyvinyl alcohol
  vectran; fully aromatic polyester
  PET: polyethylene terephthalate (aromatic polyester)
  PEN: polyethylene naphtarete (aromatic polyester).

In the "Fabrication sequence" item,
  A: first twist, second twist, and then dip-and-stretch treatment

TABLE 2

| Tire | Ex. 9 |
|---|---|
| Band cord | |
| Material | aramid |
| Twist | FIG. 5 |
| Core strand | |
| number | 2 |
| One strand | |
| Total dtex number | 440 |
| First twist number Nc (turn/10 cm) | 95 |
| Second twist number Nm (turn/10 cm) | 95 |
| Other strand | |
| Total dtex number | 440 |
| First twist number Nc (turn/10 cm) | 95 |
| Second twist number Nm (turn/10 cm) | 95 |

TABLE 2-continued

| Tire | Ex. 9 |
|---|---|
| Sheathe strand | |
| number | 2 |
| One strand | |
| Total dtex number | 1670 |
| First twist number Ns (turn/10 cm) | 10 |
| Second twist number M 2(turn/10 cm) | 7 |
| Other strand | |
| Total dtex number | 1670 |
| First twist number Ns (turn/10 cm) | 10 |
| Second twist number M (turn/10 cm) | 7 |
| Boundary point (%) | 1.5 |
| Modulus ratio (EH/EL) | 7 |
| fabrication sequence | B |
| Status of vulcanization | no problem |
| Tire weight | 100.5 |
| High-speed durability | 105 |
| Vibration characteristic | 106 |

As apparent from the comparisons between Reference tires and Example tires, in particular comparisons of Ex.1 with Ref.5, Ex.2 with Ref.6, and Ex.4 with Ref.7—each pair being the same in the dtex number, first twist number and second twist number—, owning to the dip-and-stretch treatment carried out between the first twisting process and the second twisting process, the Example cords were provided with the remarkable double modulus zones, and a necessary stretch could be obtained during tire vulcanization, and as a result, the tires could be molded without problem and displayed excellent performances. By contrast, in the case of Reference tires 3-7, molding defects were occurred, and the tires had no commercial value.

Aside from passenger car tires, the present invention can be applied to various tires as well, for example, motorcycle tires, SUV tires and the like. For example, in the case of motorcycle tires provided with no breaker 7, the band 9 is directly disposed on the radially outside of the crown portion of the carcass 6.

The invention claimed is:

1. A pneumatic tire comprising
   a carcass extending between a pair of bead portions through a tread portion and a pair of sidewall portions, and
   a band made of at least one spirally wound cord disposed radially outside the carcass in the tread portion,
   wherein
   the band cord consists of materially identical high-strength high-modulus organic filaments, and the band cord is obtainable by the following process (1) or (2):
   (1) the high-modulus organic filaments are divided into a plurality of bunches, the bunches are each first twisted separately from each other, the first twisted bunches are each subjected to a dip-and-stretch treatment, and the treated bunches are second twisted together; or
   (2) the high-modulus organic filaments are divided into a plurality of bunches, the bunches are each first twisted separately from each other, the first twisted bunches are each subjected to a dip-and-stretch treatment, some of the treated bunches are second twisted together to form a core, and at least one remaining treated bunch is spirally wound around the core, whereby
   the band cord has a load-elongation curve comprising a low-modulus zone between the origin and a boundary point and a high-modulus zone between the boundary point and the breaking point, and the boundary point is at a certain elongation in a range of from 1 to 7%, and
   the ratio EH/EL of a nominal elastic modulus EH of the high-modulus zone and a nominal elastic modulus EL of the low-modulus zone is in a range of from 2.0 to 10.0, wherein
   the load of the band cord at 1% elongation is in a range of from 20 to 60 N, and
   the load of the band cord at 3% elongation is in a range of from 225 to 431 N.

2. The pneumatic tire according to claim 1, wherein
   the organic filaments are aromatic polyamide filaments, fully aromatic polyester filaments, polyvinyl alcohol filaments having a strength of not less than 15g/dtex, carbon filaments, polyketone filaments or rayon filaments.

3. The pneumatic tire according to claim 1, wherein
   said at least one spirally wound cord of the band forms a single layer extending across the almost entire width of the tread, and
   the carcass is composed of a single ply of organic fiber cords arranged radially at substantially 90 degrees with respect to the tire equator.

4. The pneumatic tire according to claim 1, wherein
   the first twisted bunches include a low-twist bunch of which first twist number is a minimum value Nmin, and a high-twist bunch of which first twist number is a maximum value Nmax, and the ratio Nmin/Nmax is not more than 0.9.

5. The pneumatic tire according to claim 4, wherein
   the second twist number M of the treated bunches is not less than the minimum value Nmin and not more than the maximum value Nmax.

6. The pneumatic tire according to claim 1, wherein
   all of the first twisted bunches have same first twist numbers.

* * * * *